(12) United States Patent
Lin et al.

(10) Patent No.: US 6,761,099 B2
(45) Date of Patent: Jul. 13, 2004

(54) VENETIAN BLIND CUTTING MACHINE CAPABLE OF CLAMPING THE SLATS AUTOMATICALLY

(75) Inventors: Jung-Kuei Lin, Hsinchu (TW); Lei-Yi Chen, Hsinchu (TW)

(73) Assignees: Industrial Technology Research Institute, Hsinchu Hsien (TW); Nien Made Enterprise Co., Ltd., Changhua Hsien (TW)

( * ) Notice: Subject to any disclaimer, the term of this patent is extended or adjusted under 35 U.S.C. 154(b) by 40 days.

(21) Appl. No.: 10/122,174

(22) Filed: Apr. 16, 2002

(65) Prior Publication Data

US 2003/0110913 A1 Jun. 19, 2003

(30) Foreign Application Priority Data

Dec. 17, 2001 (TW) ..................................... 90223100 U

(51) Int. Cl.[7] .............................. B26D 7/02; B26D 1/00
(52) U.S. Cl. ............................. 83/200; 83/454; 83/637; 83/824; 29/24.5
(58) Field of Search .......................... 83/200, 454, 637, 83/821–829; 29/24.5

(56) References Cited

U.S. PATENT DOCUMENTS

| | | | | |
|---|---|---|---|---|
| 5,037,253 A | * | 8/1991 | Molaro et al. ............... | 29/24.5 |
| 5,799,557 A | * | 9/1998 | Wang ........................... | 29/24.5 |
| 5,816,126 A | * | 10/1998 | Pluber ......................... | 29/24.5 |
| 5,927,172 A | * | 7/1999 | Wang ........................... | 83/454 |
| 6,089,134 A | * | 7/2000 | Marocco ....................... | 83/454 |
| 6,196,099 B1 | * | 3/2001 | Marocco ....................... | 29/24.5 |
| 6,240,824 B1 | * | 6/2001 | Hsu ............................. | 29/24.5 |
| 6,314,851 B1 | * | 11/2001 | Graves et al. ............... | 29/24.5 |
| 6,334,379 B1 | * | 1/2002 | Sudano ........................ | 29/24.5 |
| 6,681,673 B1 | * | 1/2004 | Kutchmarek et al. ......... | 83/468 |
| 6,688,204 B2 | * | 2/2004 | Huang ......................... | 83/454 |

\* cited by examiner

*Primary Examiner*—Allan N. Shoap
*Assistant Examiner*—Jason Prone
(74) *Attorney, Agent, or Firm*—Browdy and Neimark, P.L.L.C.

(57) ABSTRACT

A Venetian blind cutting machine comprises a mold assembly, which has a main block and a guiding slot on the main block. A sliding block slidably receives in the guiding slot. The guiding slot has at least one stopping potion for stopping the sliding block. The sliding slot is for receiving slats therein between a closed end of the guiding slot and the sliding block. A cutter is slidably provided at the main block of the mold assembly for free shifting. Two driving bars have ends thereof fastening to the cutter. A joint block has two openings for receiving the driving bars therein and holding the driving bar therein by friction. The joint block is fastened to the sliding block. Whereby, the driving bar will drive the cutter, the joint block and the sliding block to move along with it. The sliding block will press the slats first to lock the slats in the guiding slot automatically. While the joint block has been pressing the slats, the driving force of the driving bar will overcome the friction of the joint block. Thus, the joint block will loose the driving bar and the driving bar will move continually and drive the cutter to cut the slats.

6 Claims, 6 Drawing Sheets

VENETIAN BLIND CUTTING MACHINE CAPABLE OF CLAMPING THE SLATS AUTOMATICALLY

FIELD OF THE INVENTION

The present invention relates generally to a Venetian blind cutting machine, and more particularly to a clamping device of the Venetian blind cutting machine, which is capable of clamping the slats of the Venetian blind automatically.

BACKGROUND OF THE INVENTION

In early years, the cutting proceeding of the Venetian blind was carried out by a cutting machine, which can only cut the head rail, the bottom rail and the slats of the Venetian blind one by one. Recently, there are cutting machines, which can cut the elements of the Venetian blind in a single procedure. In the prior arts, the Venetian blind cutting machine provided a mold, which provided receiving holes for clamping the head rail, the bottom rail and the slats therein. Then a cutter, which is driven by motor or hydraulic linear actuator, cuts them into the end items.

U.S. Pat. No. 6,079,306 disclosed a Venetian blind cutting machine, which comprises a mold having top-rail block, a bottom-rail block and a slat block. The top-rail block and the bottom-rail block have receiving holes for clamping head rail and bottom rail therein. The bottom-rail block slides toward or away from the slat block for receiving slats in the space between the two blocks. A bolt is to drive the bottom-rail block slides pressing the slats, such that a cutter can cut the slats in a predetermined length. After that, operator can loosen the bolt to take the slats out.

Many Venetian blind cutting machines in the market are similar to the prior art as disclosed above. Each of these cutting machines usually has a sliding block (such as the bottom-rail block disclosed in the U.S. Pat. No. 6,079,306) for pressing the slats. A clamping device (such as the bolt disclosed in the U.S. Pat. No. 6,079,306) is to push the sliding block for clamping the slats as described above. Then a cutter is driven to cutter the slats. After cut-off the elements, the clamping device also can draw the sliding block back for taking the slats out.

Another apparatus for clamping slats in a conventional Venetian blind cutting machine is to dispose a base block beside the mold. A threaded rod is screwed into the base block and having inner end thereof orientating to the sliding block. The outer end of the thread rod provides with a crank for operator to grip it to turn for driving the threaded rod shifting forward to press the sliding block for clamping the slats.

In operating the prior arts as described above, operator must drive the sliding block to clamp the slats and to release the slats in every cut-off procedure. It is not a fine operating procedure.

SUMMARY OF THE INVENTION

The primary objective of the invention is to provide a clamping apparatus of Venetian blind cutting machine, which can automatically lock and release the slats.

According to the objective of the invention, a Venetian blind cutting machine of the present invention comprising a mold assembly, which has a main block and a guiding slot on the main block. A sliding block slidably receives in the guiding slot. The guiding slot has at least one stopping portion for stopping the sliding block. The sliding slot is for receiving slats therein between a closed end of the guiding slot and the sliding block. A cutter is slidably provided at the main block of the mold assembly for free shifting. At least one driving bar has one end thereof fastening to the cutter. The driving bar is substantially parallel to the guiding slot and being driven to shift along the guiding slot, and a joint block has at least one opening for receiving the driving bar and holding the driving bar therein by friction. The joint block is fastened to the sliding block of the mold assembly. Whereby, the driving bar will drive the cutter, the joint block and the sliding block to move along with it. The sliding block will press the slats first to lock the slats in the guiding slot automatically. While the joint block has been pressing the slats, the driving force of the driving bar will overcome the friction of the joint block. Thus, the joint block will loosen the driving bar and the driving bar will move continually and drive the cutter to cut the slats.

DETAILED DESCRIPTION OF THE INVENTION

Please refer to FIGS. 1–4, a clamping device of Venetian blind cutting machine of the preferred embodiment of the present invention comprises the following elements.

Figure 3:
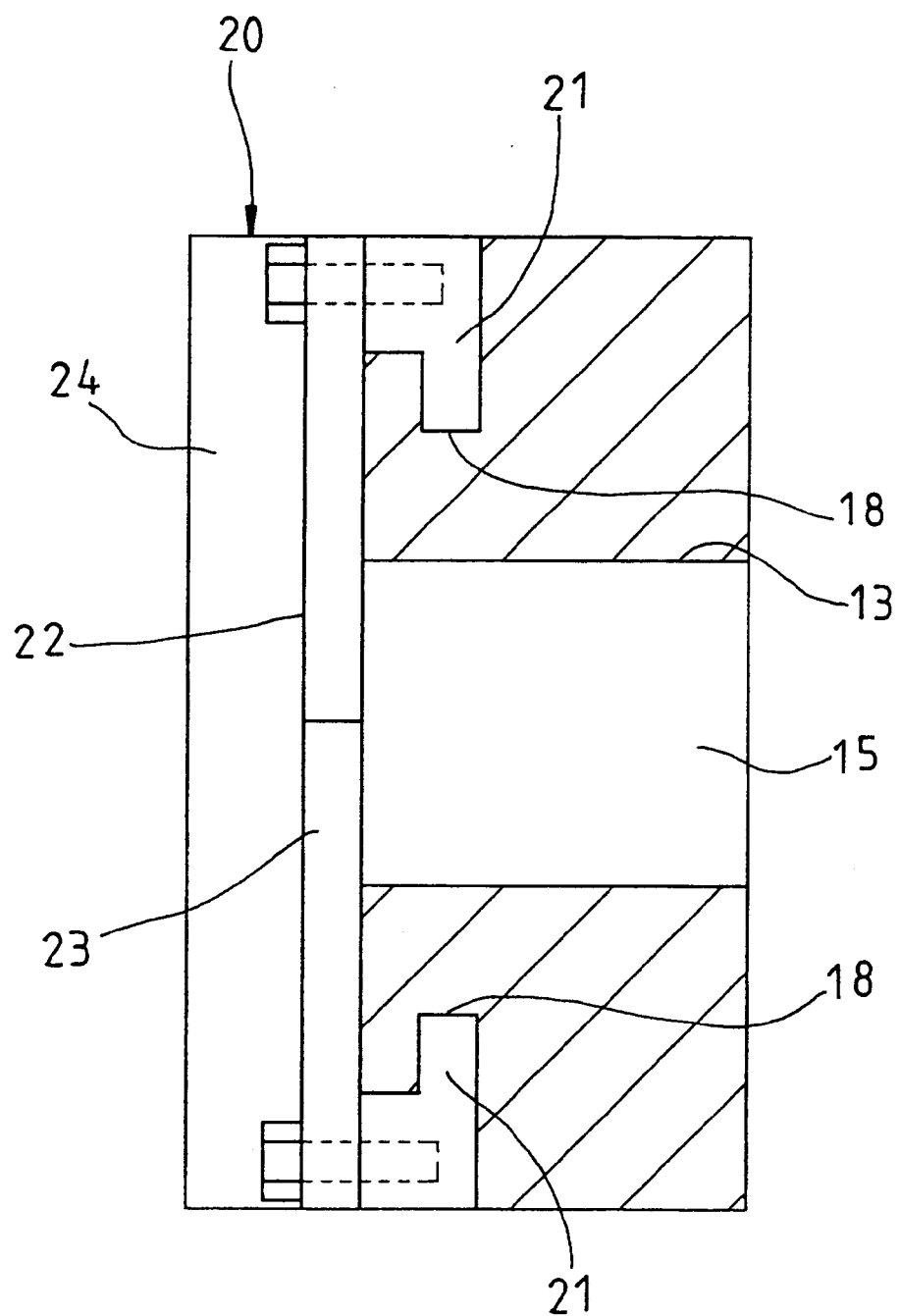
FIG. 3 is a sectional view taken along line 3—3 in FIG. 1.

A mold assembly 10 has a main block 11, which is an elongated, rectangular plank, having a top-rail receiving hole 12 at right side thereof for mounting a top rail (not shown) of the Venetian blind therein. A guiding slot 13 is provided at the left side of the main block 11. The guiding slot 13 has an opening end at left and a closed end at right. The guiding slot 13 has two stopping portions 14 at two lateral walls respectively. A sliding block 15 is slidably received in the guiding slot 13 for free sliding between the closed end of the guiding slot 13 and the stop portions 14. Thus, the sliding block 15 will be stopped by the stopping portions 14 when sliding outwardly. The sliding block 15 has a bottom-rail receiving hole 16 for mounting a bottom rail (not shown) therein. A space left in the guiding slot 13 between the closed end of the guiding slot 13 and the sliding block 15 is defined as a slat receiving hole 17. The dimension of the slat receiving hole 17 is adjusted by shifting the sliding block 15. The main block 11 further has two guiding tracks 18 that are respectively disposed at upper and lower sides thereof as shown in FIG. 3.

A cutter assembly 20 has two sliding strips 21 that are slidably received in the guiding tracks 18 of the main block 11 respectively. A cutter board 22 fastens to the sliding strips 21 by bolts (not shown). Thus, the cutter board 22 slides on the main block 11 when the sliding strips 21 are forced to slide in the guiding tracks 18. A cutter 23 is disposed on the cutter board 22 at right side thereof facing to the closed end of the guiding slot 13 of the mold assembly 10. A base block 24 fastened to the left side of the cutter board 22.

Two parallel driving bars 30 have ends fastening to the base block 24 of the cutter assembly 20. The driving bars 30 are parallel to the elongated axial of the guiding slot 13 of the mold assembly 10. The driving bars 30 are driven by a motor or a hydraulic pump (not shown) to shift forwardly and backwardly. The apparatus for driving the driving bars 30 to shift has been disclosed in the prior art, so I will not describe the detail.

Figure 4:
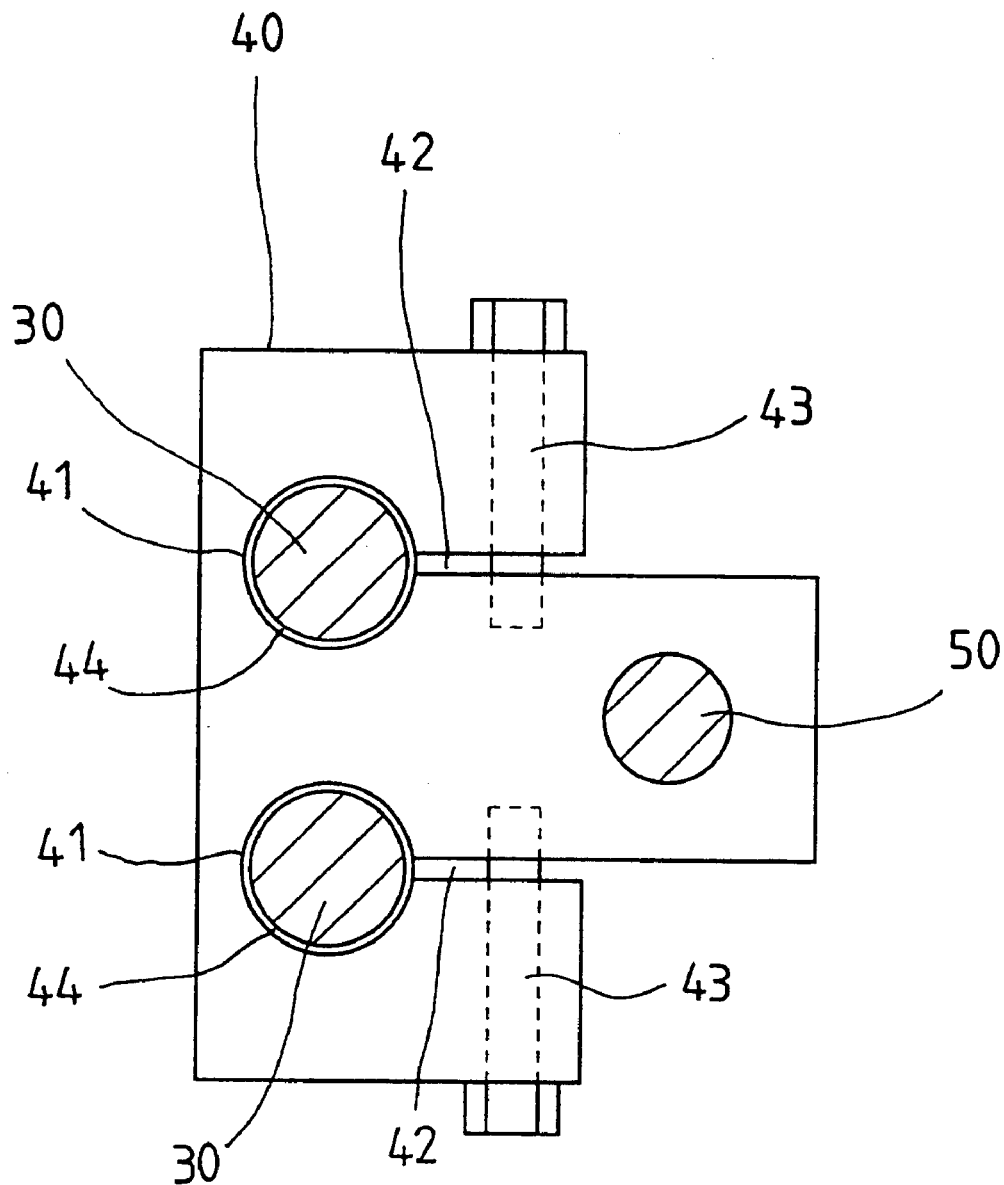
FIG. 4 is a sectional view taken along line 4—4 in FIG. 1.

A joint block 40, please refer to FIG. 4, has two openings 41 and two gaps 42 extending to the openings 41 respectively. Two bolts 43 screw into the joint block 40 crossing the gaps 42 respectively for adjusting the dimensions of the openings 41. Two resistant rings 44, which are made of high friction coefficient materials, are firmly mounted in the openings 41 respectively. The driving bars 30 pass through the resistant rings 44 in the openings 41 of the joint block 40 respectively. The resistant rings 44 are against the driving bars 30 to make the joint block 40 holding the driving bars 30 by friction. The frictions between the resistant rings 44 and the driving bars 30 are adjusted by turning loose or turning tight the bolts 43.

A connecting bar 50 is parallel to the driving bars 30, which has one end thereof fastening to the joint block 40, and the other end thereof fastening to the sliding block 15.

We certainly can fasten the joint block 40 to the sliding block 15 directly to replace the connecting bar 50.

Figure 1:
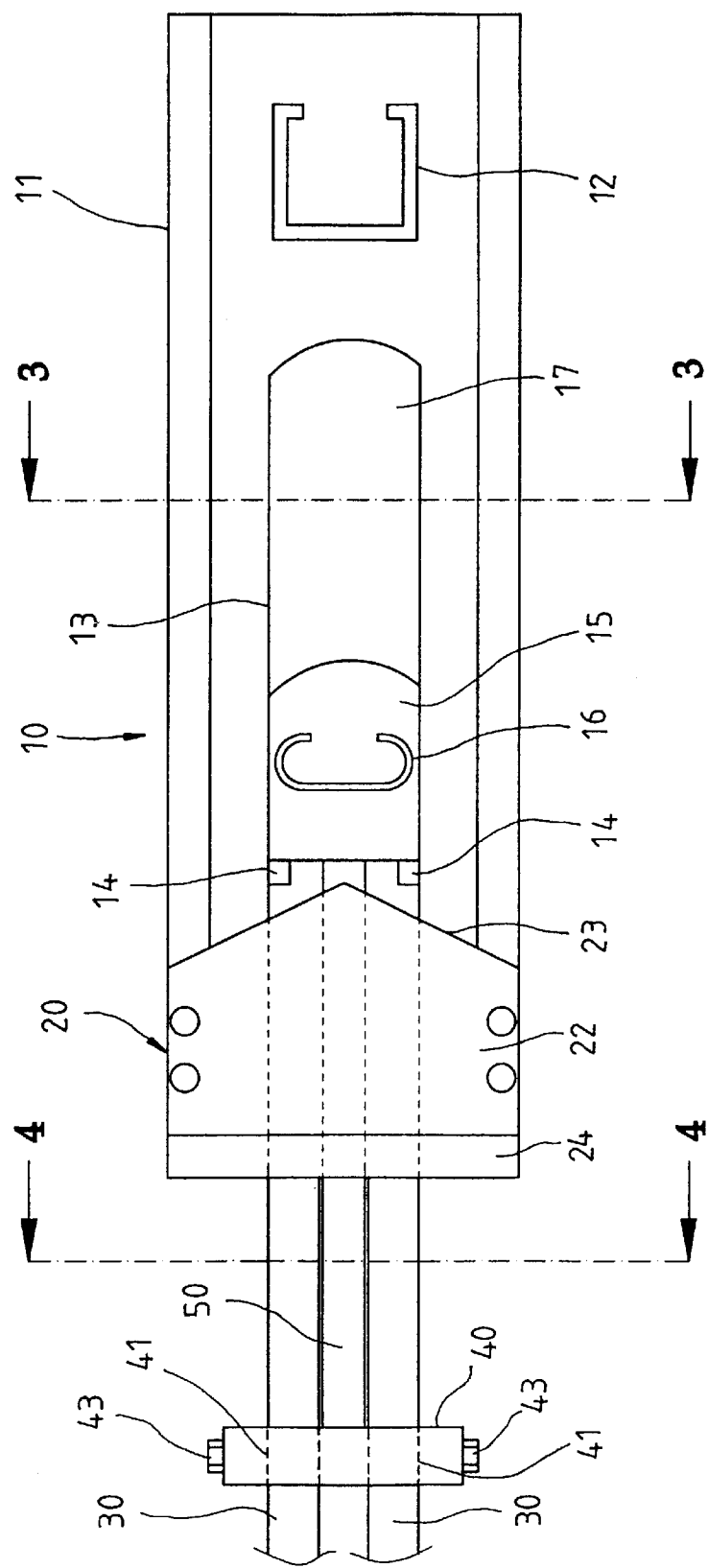
FIG. 1 is a front side view of a preferred embodiment of the present invention.
Figure 2:
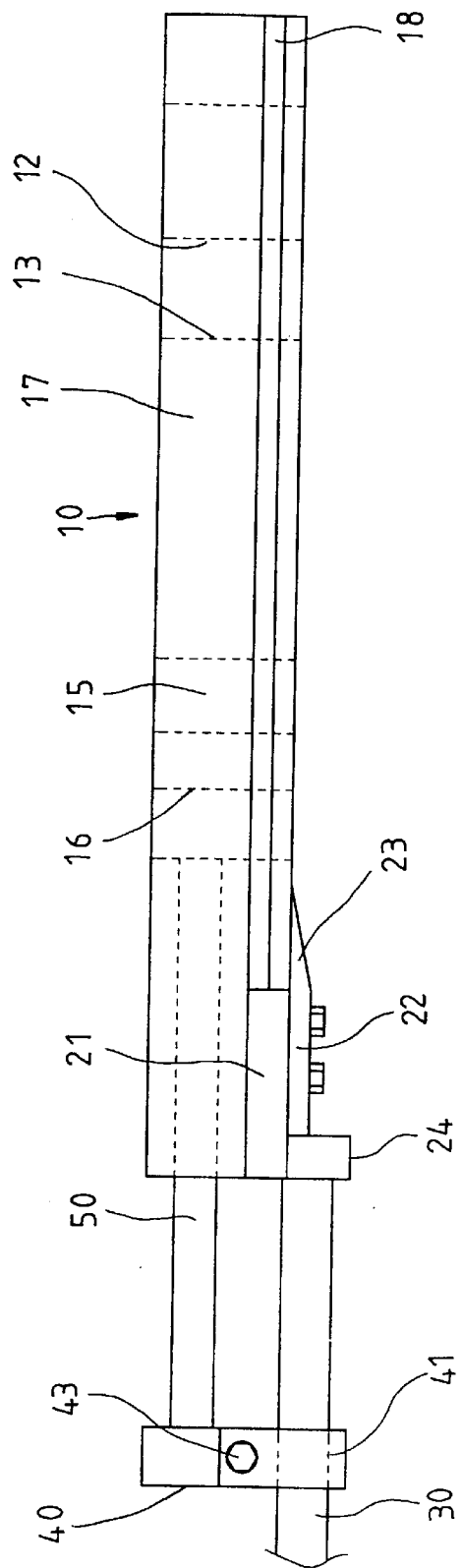
FIG. 2 is a topside view of the preferred embodiment of the present invention.

Before to process the cut-off procedure, please refer to FIG. 1, the initial position of the sliding block 15 is locating at the left side of the guiding slot 13 and is against the stopping portions 14. The initial position of the cutter assembly 20 is that the cutter 23 locates at the left side of the bottom-rail receiving hole 16 of the sliding block 15. Operator can mount a top rail, a bottom rail and slats into the top-rail receiving hole 12, the bottom-rail receiving hole 16 and the slat receiving hole 17 respectively.

Figure 5:
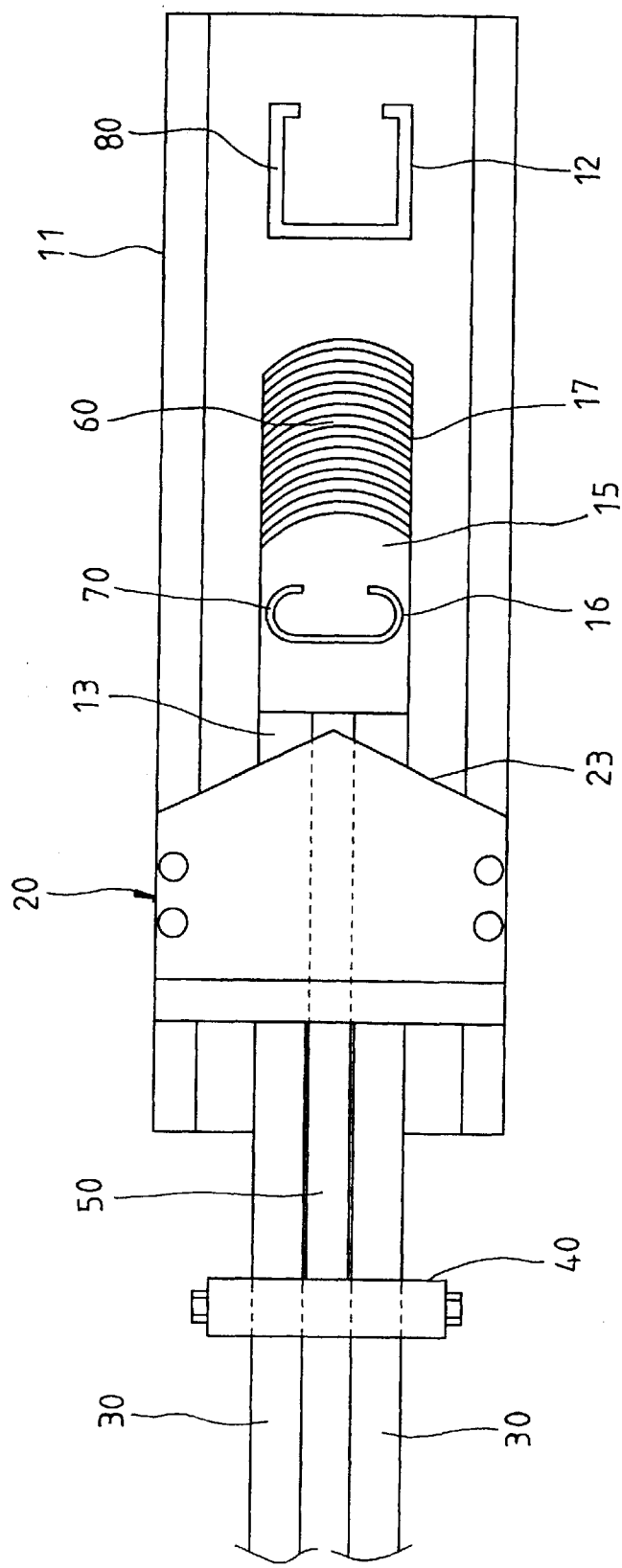
FIG. 5 and FIG. 6 are schematic views of the preferred embodiment of the present invention, showing the sliding block clamping and loosing the slats automatically in a cut-off procedure.

Now operator can start the motor (or the hydraulic pump) to drive the driving bars 30 shifting right. Thus, please refer to FIG. 5 and FIG. 6, the cutter assembly 20, the joint block 40 and the sliding block 15 will move along with the driving bars 30. The sliding block 15 will press the slats 60 first to lock the slats 60 in the sliding slot 13 as shown in FIG. 5.

Figure 6:
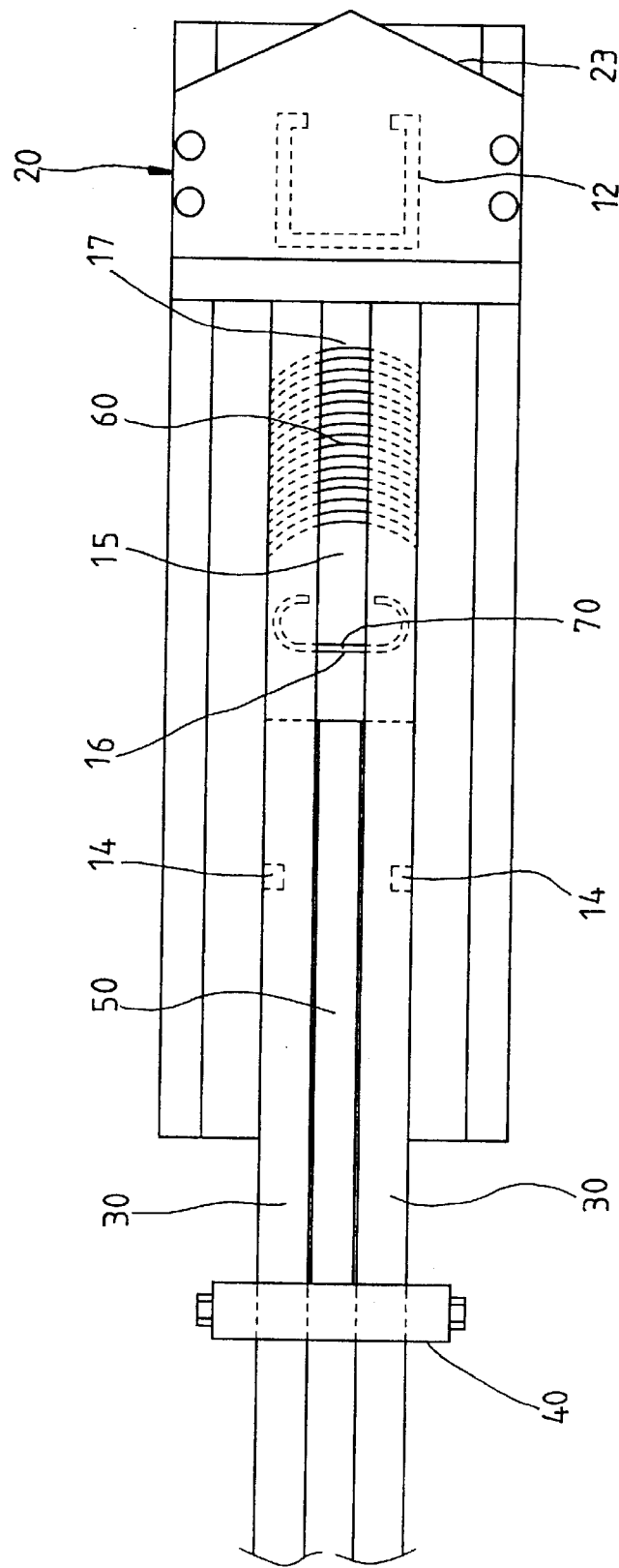

After the sliding block 15 is stopped by the slats 60, the motor will make the driving bars 30 overcoming the friction of the resistant rings 44. Thus, the joint block 40 will no longer hold the driving bars 30, and the driving bars 30 will shift continually to drive the cutter assembly 20 only to move along with it. Finally, the cutter 23 of the cutter assembly 20 will cut the top rail 80, the bottom rail 70 and slats 60 as shown in FIG. 6.

After cut off the elements, the motor will drive the driving bars 30 to shift back. In the meantime, the cutter assembly 20 and the sliding block 15 are shifting back along with the driving bars 30 (the frictions between the driving bars 30 and the resistant rings 44 will make the joint block 40 to hold the driving bars 30 again). Till the sliding block 15 is stopped by the stopping portions 14, the continuous back shifting force of the driving bars will again overcome the frictions of the resistant rings such that the sliding block 15 and the joint block both stop moving and the driving bars 30 and the cutter assembly 20 will shift back continually. Finally, all elements of the cutting machine of the present invention will return to the initial positions as shown in FIG. 1 to complete the cut-off procedure.

The cutting machine of the present invention provides a function of clamping and loosing the slats 60 automatically in each cut-off procedure. There is no extra procedure to lock the slats 60 in the cut-off procedure of the present invention. It increases the performance of the cutting machine of the present invention to cut the top rail, the bottom rail and the slats of the Venetian blind.

What is claimed is:

1. A Venetian blind cutting machine comprising:

a mold assembly having a main block provided with a guiding slot thereon which has a closed end and an open end, a sliding block slidably received in said guiding slot, an opening formed between the closed end of the guiding slot and the sliding block for receiving slats of the Venetian blind therein; said guiding slot provided with a stopping portion adjacent to the open end for stopping said sliding block;

a cutter movably installed at said main block of said mold assembly for free shifting along a direction substantially parallel to said guiding slot;

at least one driving bar having one end thereof fastened to said cutter; said driving bar being substantially parallel to said guiding slot and being driven to shift along a direction substantially parallel to said guiding slot, a joint block having at least one opening for receiving said driving bar and holding said driving bar therein by friction;

a connecting bar, which is substantially parallel to said driving bar, having one end thereof fastened to said joint block, and the other end thereof fastened to said sliding block;

wherein, when said driving bar is driven, said cutter, said joint block and said sliding block move along with the driving bar and said sliding block presses the slats first to lock the slats in said closed end of the guiding slot while said joint block moves with the driving bar and the sliding block presses the slats, the driving force of said driving bar overcomes the friction of said joint block so that said joint block will loosen said driving bar and said driving bar will move continually and drive said cutter to move along with the driving bar.

2. The Venetian blind cutting machine as defined in claim 1, comprises two driving bars.

3. The Venetian blind cutting machine as defined in claim 1, wherein said main block of said mold assembly has a top-rail receiving hole and said sliding block of said mold assembly has a bottom-rail receiving hole.

4. The Venetian blind cutting machine as defined in claim 1, wherein said joint block further comprises a resistant ring, which is made of a high fiction coefficient material, disposed in said opening.

5. The Venetian blind cutting machine as defined in claim 1, wherein said joint block has a gap extending to said opening, and a bolt screwed into said joint block and crossing said gap adjusts the dimension of said opening.

6. The Venetian blind cutting machine as defined in claim 5, wherein said joint block further comprises a resistant ring, which is made of a high fiction coefficient material, disposed in said opening.

* * * * *